(12) United States Patent
De Keyzer et al.

(10) Patent No.: US 6,730,737 B1
(45) Date of Patent: May 4, 2004

(54) RELEASABLE PRESSURE SENSITIVE ADHESIVE COMPOSITION

(75) Inventors: Noel Raymond Maurice De Keyzer, Louvain-La-Neuve (BE); Geert Emiel Anna Vermunicht, Louvain-La-Neuve (BE)

(73) Assignee: Kraton Polymers U.S. LLC, Houston, TX (US)

( * ) Notice: Subject to any disclaimer, the term of this patent is extended or adjusted under 35 U.S.C. 154(b) by 1,009 days.

(21) Appl. No.: 08/363,438

(22) Filed: Dec. 22, 1994

(30) Foreign Application Priority Data

Dec. 27, 1993 (BE) .............................. 93203707

(51) Int. Cl.⁷ .................................................. C08F 8/00
(52) U.S. Cl. ........................ 525/105; 525/88; 525/89; 525/98; 525/185; 525/326.5; 525/342
(58) Field of Search ............................. 525/88, 89, 98, 525/105, 185, 326.5, 342

(56) References Cited

U.S. PATENT DOCUMENTS

| | | | | |
|---|---|---|---|---|
| 4,288,480 A | * | 9/1981 | Grzywinski et al. | 525/99 |
| 4,514,554 A | * | 4/1985 | Hughes et al. | 525/99 |
| 4,552,819 A | * | 11/1985 | Hibino | 525/57 |
| 4,556,464 A | * | 12/1985 | St. Clair | 525/98 |
| 4,680,333 A | | 7/1987 | Davis | |
| 4,831,080 A | | 5/1989 | Blizzard et al. | |
| 4,997,709 A | * | 3/1991 | Huddleston et al. | 525/98 |
| 5,112,889 A | * | 5/1992 | Miller et al. | 525/98 |
| 5,242,984 A | * | 9/1993 | Dillman et al. | 525/314 |
| 5,372,870 A | * | 12/1994 | Diehl et al. | 525/98 |
| H1402 H | * | 1/1995 | Chin et al. | 525/314 |

FOREIGN PATENT DOCUMENTS

| | | |
|---|---|---|
| EP | 0340979 | 11/1989 |
| EP | 0443263 | 8/1991 |
| EP | 0519086 | 7/1992 |
| JP | 61060727 A | 9/1984 |
| WO | 88/01631 | 3/1988 |
| WO | 88/01636 | 3/1988 |
| WO | 93/24547 | 12/1993 |

* cited by examiner

Primary Examiner—Randy Gulakowski

(57) ABSTRACT

A releasable pressure sensitive adhesive composition comprising:

(a) a block copolymer comprising at least one poly(monovinyl aromatic hydrocarbon) block and at least one poly(conjugated diene) block and having a vinyl content of at least 3% by weight, (b) a tackifying resin, and (c) a plasticizer, wherein the block copolymer has been crosslinked through its vinyl groups by means of a reaction with an organohydrogenpolysiloxane crosslinking agent containing at least two hydrogen atoms which are directly bonded to a silicon atom. This is carried out in the presence of a crosslinking catalyst. The plasticizer is present in an amount of from 1 to 50 parts by weight per 100 parts by weight of block copolymer. The releasable adhesive composition can be suitably applied in removable self-adhering memo notes and in removable tapes and labels.

11 Claims, No Drawings

RELEASABLE PRESSURE SENSITIVE ADHESIVE COMPOSITION

FIELD OF THE INVENTION

The present invention relates to a releasable pressure sensitive adhesive composition. More specifically, the present invention relates to a releasable, pressure sensitive adhesive composition comprising a crosslinked block copolymer based on a conjugated diene and a vinyl aromatic hydrocarbon.

BACKGROUND OF THE INVENTION

Releasable pressure sensitive adhesives are used in numerous applications wherein tackiness and removability without leaving traces of adhesives on the substrate (even after repeated use) are required. Specific examples include self-adhering memo labels, removable tapes, and reusable closure systems, such as closures of packages containing tissues. Several adhesive compositions meeting the above requirements have already been proposed in the past. For instance, U.S. Pat. No. 4,680,333 discloses a removable pressure sensitive hot melt adhesive composition comprising an ABA type block copolymer, with A being polystyrene and B polyisoprene, and a substantial amount (up to 50% by weight of the composition) of aliphatic hydrocarbon resin having a softening point of less than 30° C. Such hydrocarbon resins mainly include liquid tackifying resins. In addition to these components, other components, such as high softening point aliphatic hydrocarbon resins, i.e. solid tackifying resins, mineral oil or petroleum, metallic salts of fatty acids and antioxidants, may be present too.

WO 88/01631 and WO 88/01636 both relate to a readhering and releasable gelled solid adhesive for coating substrates, particularly paper, comprising a rubber component, a water-soluble or water-dispersible tackifying agent, and a gelling agent. A friction reducing agent, comprising a polyhydric aliphatic alcohol may be present as well. Natural rubber latex is stated to be the preferred rubber component. The preferred gelling agent is sodium stearate.

EP 0,443,263 discloses a repositionable adhesive coated substrate whereby the adhesive layer is comprised of 20 to 80% by weight of an elastomeric styrenetbutadiene, styrenelisoprene, or styrenelethylene-butylene block copolymer with the balance up to 100% by weight being a tackifier material. This tackifier material is either a tackifying resin (liquid and/or solid) or a blend of a tackifying resin and a liquid plasticizer oil. The purpose of the tackifier material is to modify the composite midblock glass transition temperature (CMTg) which is taught to be an important parameter for the properties of the adhesive composition.

Although the releasable and readherable adhesive compositions disclosed in the documents discussed hereinbefore perform satisfactorily, there is still interest in developing alternatives. One of the reasons for that is the presence of relatively large amounts of plasticizer and/or liquid tackifying resins in the prior art compositions. EP 0,443,263 teaches that these components are necessary for obtaining a composition having a low CMTg which is said to be essential for good releasability. One of the objects of the present invention is to provide a releasable pressure sensitive adhesive composition containing a relatively small amount of plasticizer and/or liquid tackifying resin which still exhibits excellent releasability in combination with sufficient tackiness, even after having been used repeatedly.

Adhesive compositions containing a relatively small amount of plasticizer and/or liquid tackifying resin are known from EP 0,519,086. This European patent application discloses an adhesive tape wherein both sides are coated with an adhesive layer. One adhesive layer is made of an acrylic or rubber-based pressure sensitive adhesive composition and a relatively small amount of silicone polymer, while the other adhesive layer is solely constituted of an acrylic or rubber-based pressure sensitive adhesive composition. Due to the different composition of both layers, they can be easily released and separated from each other at their interface, thus enabling the adhesive tape to be stored or sold as a roll. The easy separation of both layers at their interface is attributed to the presence of the silicone polymer in one of the layers which bleeds to the surface of the adhesive layer where it forms a silicone film. Due to its visoelasticity, this silicone film exhibits adhesive properties and hence can serve as an adhesive layer. Since the silicone polymers disclosed do not contain any reactive group or atom which might interact with the acrylic or rubber polymer molecules, it is clear that the silicone polymer does not act as a crosslinking agent for connecting the various acrylic or rubber polymer molecules present in the pressure sensitive adhesive composition.

U.S. Pat. No. 4,831,080 discloses a composition comprising a pressure sensitive adhesive and a liquid organohydrogenpolysiloxane containing on the average at least two silicon-bonded hydrogen atoms per molecule. When this composition is combined with a composition comprising the same pressure sensitive adhesive and a curing agent for said liquid organohydrogenpolysiloxane, a crosslinkable pressure sensitive adhesive composition is obtained. However, the adhesive properties are such that it cannot be used as a releasable adhesive. Hence, the use of the composition as a releasable adhesive is evidently not intended. The pressure sensitive adhesive may be based on styrene-butadiene random copolymers as well as on acrylic or butyl polymers. Styrene-butadiene block copolymer-based adhesives are not explicitly disclosed. Among the large group of suitable curing agents disclosed, there are mentioned platinum compounds, such as platinum acetylacetonate and chloroplatinic acid. As becomes apparent from the working examples of the patent, particularly examples 34 and 35, such platinum compounds must be used in conjunction with a curing accelerator, such as methylvinylsiloxane, in order to achieve an acceptable level of crosslinking in styrene-butadiene polymer-based pressure sensitive adhesives.

The present invention aims to provide a releasable pressure sensitive adhesive composition which adheres very well to various substrates including paper and plastics, can be removed from the substrate without leaving any traces behind, and can be used repeatedly without loss of tackiness. It is a further object of the present invention to provide a releasable pressure sensitive adhesive composition which contains a relatively small amount of plasticizing oil and/or liquid tackifying resin. More specifically, the present invention aims to provide a releasable pressure sensitive adhesive composition based on a monovinyl aromatic-conjugated diene block copolymer wherein the block copolymer molecules are crosslinked via a crosslinking reaction with an organohydrogenpolysiloxane cross-linking agent without the use of any curing accelerator. It is also an object of the present invention to provide a releasable pressure sensitive adhesive composition wherein the monovinyl aromatic-conjugated diene block copolymer is crosslinked through vinyl groups present in the poly(conjugated diene) blocks.

Surprisingly, it has now been found that releasable pressure sensitive adhesive compositions based on crosslinked block copolymers can be obtained without using any curing accelerator and that such compositions need contain only relatively small amounts of plasticizer, i.e. no more than 50 parts by weight per 100 parts by weight of block copolymer.

SUMMARY OF THE INVENTION

Accordingly, the present invention relates to a releasable pressure sensitive adhesive composition comprising:

(a) a block copolymer comprising at least one poly(monovinyl aromatic hydrocarbon) block and at least one poly(conjugated diene) block and having a vinyl content of at least 3%, (b) a solid tackifying resin, and (c) a plasticizer, wherein the block copolymer has been crosslinked through its vinyl groups by means of a reaction with an organohydrogenpolysiloxane crosslinking agent containing at least two hydrogen atoms which are directly bonded to a silicon atom. The crosslinking takes place in the presence of a crosslinking catalyst. The plasticizer is present in an amount of from 1 to 50 parts by weight per 100 parts by weight of block copolymer.

DETAILED DESCRIPTION OF THE INVENTION

The expression "vinyl groups" as used throughout this specification refers to the ethylenically unsaturated groups extending (pending) from the poly(conjugated diene) backbone portions of the block copolymer, which groups result from polymerization of the conjugated diene monomer at the 1,2- or 3,4-positions. Accordingly, the expression "vinyl content" refers to that portion of the conjugated diene monomer molecules incorporated in the block copolymer which have polymerized at the 1,2- or 3,4-position.

By using the existing functionality present in the poly(conjugated diene) blocks of the block copolymer in the form of vinyl groups, the cross-linking reaction can be performed in the presence of only a cross-linking catalyst without the use of any curing accelerator. Moreover, by using said existing functionality to establish cross-linking, a possible additional reaction for introducing functional groups, such as carboxyl groups or amine groups, is avoided.

The block copolymer used may be any block copolymer comprising at least one poly(monovinyl aromatic hydrocarbon) block A and at least one poly(conjugated diene) block B containing sufficient vinyl groups to enable an acceptable level of crosslinking. It will be understood that the expression "poly(monovinyl aromatic hydrocarbon) block" covers every polymer block containing polymerized monovinyl aromatic hydrocarbon as the main constituent. Accordingly, small amounts of other copolymerized monomers, i.e. up to 20% by weight, but preferably less than 10% by weight, may be present as well. The same applies for the expression "poly(conjugated diene) block". The block copolymer may have a linear, radial or star-shaped structure.

A preferred type of block copolymer is a linear ABA type block copolymer comprising two poly(monovinyl aromatic hydrocarbon) endblocks A and one poly(conjugated diene) midblock B. Such an ABA block copolymer also includes AB'/ABA block copolymer mixtures with A and B as defined above and with B' representing a poly(conjugated diene) block having approximately half the apparent molecular weight of the polymer block B. Such mixtures result from the commonly applied coupling processes for preparing ABA block copolymers wherein difunctional coupling agents are used for coupling two living AB' polymer chains prepared by anionic solution polymerization. The general concept of such processes is for instance disclosed in Chapter 3, paragraph 4 of N. R. Legge et al., THERMOPLASTIC ELASTOMERS, Carl Hanser Verlag, Munich (1987) and U.S. Pat. No. 4,096,203 which is herein incorporated by reference. In general, the final product resulting from a coupling process will always be an AB'/ABA block copolymer mixture which may contain up to 40% by weight of AB' block copolymer, the exact content of AB' block copolymer being determined by the coupling efficiency of the coupling agent used. When using conventional difunctional coupling agents, such as dibromoethane or diethyladipate, the finally obtained AB'/ABA mixtures contain 10 to 20% by weight of AB'. These AB'/ABA block copolymer mixtures are, however, still referred to as "ABA block copolymers".

Another suitable type of block copolymer is a radial block copolymer of the general formula

$(AB)_n(B)_mX$ wherein A and B are as defined above, X is a coupling agent residue, n and m are integers of from 0 to 30, and n+m is at least 3. Other suitable types of block copolymers are those containing homopolymeric blocks as well as tapered polymer blocks, i.e. polymer blocks containing both monovinyl aromatic hydrocarbon and conjugated diene wherein the content of one of these monomers gradually increases in one direction.

Beside AB'/ABA block copolymer mixtures obtained by the coupling method, AB'/ABA block copolymer mixtures obtained by physically blending an AB' and an ABA block copolymer in any desired weight ratio may also be used. It will be understood that in this case the apparent molecular weight of B' is not necessarily half the apparent molecular weight of B. The only essential criterium is that the conjugated diene polymer blocks B and B' contain sufficient vinyl groups to enable a sufficient level of crosslinking.

For all types of block copolymers it is preferred that the poly(monovinyl aromatic hydrocarbon) block is a polystyrene block and the poly(conjugated diene) block is a polybutadiene or polyisoprene block.

The content of conjugated diene in the block copolymer may vary within a wide range, but suitably should be in the range of from 65 to 95% by weight, preferably 75 to 90% by weight, based on total weight of block copolymer. Consequently, the content of monovinyl aromatic hydrocarbon in the block copolymer ranges from 5 to 35% by weight and preferably from 10 to 25% by weight. It will be understood by those skilled in the art that too much monovinyl aromatic hydrocarbon results in a block copolymer which is too hard to be suitably applied in adhesives.

The apparent molecular weight of the block copolymer, i.e. the molecular weight as determined by gel permeation chromatography using polystyrene calibration standards, may vary over a broad range and suitably lies within the range of from 25,000 to 1,000,000. For linear block copolymers the apparent molecular weight preferably lies between 50,000 and 300,000, while for branched or star-shaped block copolymers the apparent molecular weight may even exceed 1,000,000.

Molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, N.Y., 1979.
2. *Light Scattering From Polymer Solutions*, M. B. Huglin, ed., Academic Press, New York, N.Y., 1972.
3. W. K. Kai and A. J. Havlik, *Applied Optics*, 12, 541 (1973).
4. M. L. McConnell, *American Laboratory*, 63, May, 1978.

The vinyl content should be sufficient to enable an acceptable level of crosslinking upon reaction with the crosslinking agent. In general, the level of crosslinking mainly depends on the vinyl content and on the amounts of both crosslinking agent and catalyst used. It will be understood that a relatively low vinyl content may still result in an acceptable level of crosslinking if the amount of crosslinking agent employed is sufficiently high to react with all or almost all of the vinyl groups. Accordingly, the vinyl content is not extremely critical and may vary within wide limits. In order to guarantee a minimum level of crosslinking a vinyl content of 3% is however required. The upper limit is not particularly critical and may be as high as 75%. In a preferred embodiment of the present invention, the vinyl content is in the range of from 3 to 60%, more preferably 4 to 40%. Since, in general, vinyl contents of 15% by weight or more require special measures to be taken during the polymerization process (as will be discussed below), it is highly advantageous to employ block copolymers having a vinyl content of from 3 to 10% by weight. Such block copolymers can be obtained by a polymerization process which does not require special measures for increasing the vinyl content of the block copolymers obtained.

The vinyl content of the block copolymer is usually controlled by the addition of a structure modifier to the polymerization mixture when preparing the block copolymer. Examples of suitable structure modifiers include inter alia ethers, such as e.g. tetrahydrofuran, diglyme (diethyleneglycol dimethylether), diethoxyethane, and diethoxypropane, as well as tertiary amines, such as triethylamine. When no structure modifier is used, the block copolymer will normally have a vinyl content of between 3 and 10%.

In general, the block copolymers may be produced by any well known polymerization process, such as e.g. disclosed in U.S. Pat. No. 3,231,635, U.S. Pat. No. 4,219,627 and U.S. Pat. No. 4,391,949, which are herein incorporated by reference.

Examples of commercially available block copolymers, which may be used in the adhesive composition according to the present invention include CARIFLEX® TR-1101, CARIFLEX® TR-1102 (both linear styrene-butadiene-styrene block copolymers), and CARIFLEX® TR-1107 (a linear styrene-isoprene-styrene block copolymer). CARIFLEX® is a trade mark. An example of a suitable styrene-isoprene multi-armed block copolymer is KRATON® D-1320X (KRATON® is a trade mark).

Suitable solid tackifying resins are those which are solid at room temperature and which are compatible with the poly(conjugated diene) polymer block(s). The tackifying resin may be present in amounts up to 400 parts by weight per 100 parts by weight of block copolymer (phr) and preferably is present in an amount of from 10 to 300 phr, even more preferably from 50 to 200 phr. Most preferably, the tackifying resin is present in an amount of from 100 to 150 phr ("phr" means parts pere hundred rubber wherein the rubber is the block copolymer). Combinations of two or more tackifying resins can also be suitably applied. Suitable poly(conjugated diene) compatible tackifying resins then include polyterpene resins, polyindene resins, rosin esters, hydrogenated rosins, alpha-pinene resins, beta-pinene resins, hydrocarbon resins of petroleum origin and phenolic resins. Examples are REGALITE® R91, R101, R125 and S260 (REGALITE® is a trade mark), ESCOREZ® 1310 and 5380 (ESCOREZ® is a trade mark), WINGTACK® 95 (WINGTACK® is a trade mark), FORAL® 85 and 105 (FORAL® is a trade mark), PICCOLYTE® A115, S115 and S10 (PICCOLYT® is a trade mark) and PICCOTAC® 95E (PICCOTAC® is a trade mark).

Mineral oils, both naphthenic and paraffinic oils, or low molecular weight polybutylene polymers may be used as the plasticizer. Examples of suitable plasticizers are SHELL-FLEX® 371 and 451, CATENEX® 956 and TUFFLO® 6204 (naphthenic oils), TUFFLO® 6056 (paraffinic oil) and the polybutylenes HYVIS 200, NAPVIS 30 and NAPVIS D-10. SHELLFLEX®, CATENEX, TUFFLO®, HYVIS and NAPVIS are trade marks. Also very useful are liquid resins, such as REGALREZ® 1018 (REGALREZ® is a trademark), and other oils, such as ONDINA 68 (ONDINA is a trade mark) and V-OIL 7047 (V-OIL is a trade mark). The plasticizer is used in amounts of from 1 to 50 phr, more preferably 5 to 40 phr and most preferably 10 to 35 phr.

In addition to the solid tackifying resin and the plasticizer other additives, such as antioxidants, UV stabilizers, fillers, flame retarders, and the like, may be present depending on the specific conditions under which the releasable pressure sensitive adhesive composition is to be used. As the antioxidant, any antioxidant commonly applied in adhesive formulations may be used. An example of such antioxidant is the phenolic compound IRGANOX® 1010 (IRGANOX® is a trade mark).

The organohydrogenpolysiloxane crosslinking agent must contain at least two hydrogen atoms which are directly bonded to a silicon atom which itself can undergo a polyaddition reaction with the vinyl groups of the different block copolymer chains, thus effecting crosslinking. In principle, any organohydrogenpolysiloxane which meets this criterion may be suitably applied as the crosslinking agent for the purpose of the present invention. Suitable organohydrogenpolysiloxanes then include those listed in U.S. Pat. No. 4,831,080, which is herein incorporated by reference. Preferred organohydrogenpolysiloxanes are those having the general formula

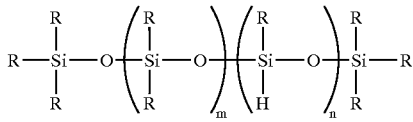

wherein R on each position independently represents a methyl or ethyl group, m is an integer of from 0 to 200, preferably 0 to 150, and n is an integer of from 2 to 60, preferably 10 to 50. Preferably, all of the R groups are methyl groups. An example of a suitable commercially available crosslinking agent of this type is DOW CORNING® 7048 (DOW CORNING® is a trade mark). Other organohydrogenpolysiloxane crosslinking agents may be sold by Wacker Chemie.

As the crosslinking catalyst there can be used any catalyst known in the art to be suitable applied for catalyzing polyaddition reactions between SiH groups in the presence of active metal-based catalysts, particularly platinum and rhodium based catalysts. Specific examples of suitable catalysts are e.g. known from U.S. Pat. No. 4,831,080, which is herein incorporated by reference. For the purpose of the present invention platinum based catalysts, such as platinum acetylacetonate, chloroplatinic acid ($H_2PtCl_6 \cdot nH_2O$), and potassium or sodium salts thereof, are preferred. A useful commercially available platinum based catalyst is DOW CORNING® Q2-7403. Other platinum based catalysts may be sold by Wacker Chemie and Rhone-Poulenc.

The releasable pressure sensitive adhesive compositions according to the present invention can be very suitably applied as the adhesive strip or layer of removable self-adhering memo notes or as the adhesive component of removable tapes and labels. Another application is the use in resealable closures, such as used for various kinds of packages of tissues and the like or such as used in diapers. It will be understood that any shaped article comprising the pressure sensitive adhesive composition as hereinbefore described also forms an aspect of the present invention.

The invention is now further illustrated by the following examples, however without restricting the scope of the invention to these specific embodiments.

EXAMPLE 1

100 parts by weight of CARIFLEX® TR-1107 (SIS block copolymer having a vinyl content of 5%, a styrene content of 14% by weight, and an average total apparent molecular weight of about 208,000), 125 parts by weight of a tackifying resin (PICCOTAC® 95E), 25 parts by weight of plasticizing oil (SHELLFLEX® 451), 1 part by weight of an antioxidant (IRGANOX® 1010), 1 part by weight of an organohydrogenpolysiloxane crosslinking agent (DOW CORNING® 7048), and 3 parts by weight of the platinum based crosslinking catalyst DOW CORNING® Q2-7403 catalyst were dissolved in toluene. The final solution had a solid content of approximately 37% by weight.

The solution was subsequently spread onto a polyester sheet with a bar coater available from Braive Industries. After evaporation of the toluene in an oven at 50° C., an adhesive layer having a thickness of 22 μm was obtained.

The adhesive layer was found to have the following properties:

| | |
|---|---|
| Rolling Ball Tack (RBT)[1] | >30 cm |
| Loop tack (LT)[2] | 14 N/25 mm |
| 180° Peel Adhesion (PA)[3] | 10 N/25 mm |
| SAFT[4] | 105° C. |

[1] RBT was determined according to ASTM D3121-73 and is a measure for tack: the shorter the distance, the greater the tack.
[2] LT was determined in the following way. A loop of tape is formed by clamping two ends of a 260 mm long and 25 mm wide strip of tape into the upper jaw of a tensile testing machine. The lower jaw carries a flat polished stainless steel plate which is placed in the direction of the longitudinal axis of the tape loop so that the contact area is between 25 and 75 mm when the tape loop is brought into contact with the steel plate. The jaws of the machine are closed at a rate of 300 mm/min. After full contact of tape loop and steel plate is achieved, the machine is reversed and the jaws are separated at the same rate. The average force required to separate the tape loop from the steel plate is recorded and expressed in N/25 mm. LT is a measure for the initial tack of a pressure sensitive adhesive when applied to a surface under only its own weight.
[3] PA was determined according to ASTM D3330M-83 and indicates the force required to release an adhesive from its substrate.
[4] SAFT stands for Shear Adhesion Failure Temperature and was determined as follows. Of a piece of 25 mm wide tape, a 25 x 25 mm overlap of tape is pressed onto a glass panel by a 2 kg roller. The panel is hung at 2° to the vertical and a 500 g load is attached to the free end of the tape. The sample is placed in an oven wherein the temperature gradually increases at a rate of 0.4° C. per minute. The temperature at which the adhesion is lost is recorded. SAFT is a measure for the short-term heat resistance of a pressure sensitive adhesive.

EXAMPLE 2 AND COMPARATIVE EXAMPLE 1

In a similar way as described in Example 1 two other compositions were prepared and spread onto a polyester sheet. The compositions and the properties of the resulting releasable adhesive layers are listed in Table I.

TABLE I

Adhesives with Linear Block Copolymer

| | Ex. 2 | Comp. Ex. 1 |
|---|---|---|
| CARIFLEX ® TR-1107 | 100 | 100 |
| PICCOTAC ® 95E | 125 | 125 |
| SHELLFLEX ® 451 | 25 | 25 |
| IRGANOX ® 1010 | 1 | 1 |
| DOW CORNING ® 7048 | 2 | 0 |
| DOW CORNING ® Q2-7403 | 6 | 0 |
| RBT (cm) | >30 | 2 |
| LT (N/25 mm) | 5 | 14 |
| PA (N/25 mm) | 5 | 11 |
| SAFT (° C.) | 108 | 101 |

EXAMPLES 3 AND 4 AND COMPARATIVE EXAMPLE 2

In a similar way as described in Example 1 three compositions were prepared and spread onto a polyester sheet. The block copolymer used was a star-shaped block copolymer containing styrene-isoprene (SI) block copolymer arms pending from a divinyl benzene (DVB) core. On the average, each molecule contains about 8 SI-arms. The styrene content of this block copolymer was 10% by weight, the vinyl content was 8% by weight, and the apparent molecular weight of each SI arm was 10,000. The compositions and the properties of the resulting releasable adhesive layers are listed in Table II.

TABLE II

Adhesives with Star-Shaped Block Copolymer

|  | Ex. 3 | Ex. 4 | Comp. Ex. 2 |
|---|---|---|---|
| (SI)$_8$DVB | 100 | 100 | 100 |
| PICCOTAC ® 95E | 125 | 125 | 125 |
| SHELLFLEX ® 451 | 25 | 25 | 25 |
| IRGANOX ® 1010 | 1 | 1 | 1 |
| DOW CORNING ® 7048 | 1 | 2 | 0 |
| DOW CORNING ® Q2-7403 | 3 | 6 | 0 |
| RBT (cm) | >30 | >30 | 3 |
| LT (N/25 mm) | 11 | 1 | 14 |
| PA (N/25 mm) | 7 | 2 | 13 |
| SAFT (° C.) | 108 | 109 | 108 |

EXAMPLES 5 AND 6 AND COMPARATIVE EXAMPLE 3

In a similar way as described in Example 1 three compositions were prepared and spread onto a polyester sheet. The block copolymer used was a linear SIS block copolymer having a styrene content of 15% by weight and a vinyl content of 7% by weight. The compositions and the properties of the resulting releasable adhesive layers are listed in Table III.

TABLE III

Adhesives with Linear Block Copolymer

|  | Ex. 5 | Ex. 6 | Comp. Ex. 3 |
|---|---|---|---|
| SIS | 100 | 100 | 100 |
| PICCOTAC ® 95E | 125 | 125 | 125 |
| SHELLFLEX ® 451 | 25 | 25 | 25 |
| IRGANOX ® 1010 | 1 | 1 | 1 |
| DOW CORNING ® 7048 | 1 | 2 | 0 |
| DOW CORNING ® Q2-7403 | 3 | 6 | 0 |
| RBT (cm) | >30 | >30 | 3 |
| LT (N/25 mm) | 8 | 2 | 19 |
| PA (N/25 mm) | 9 | 4 | 11 |
| SAFT (° C.) | 117 | 117 | 116 |

From the preceding examples it can be concluded that the adhesive compositions according to the present invention are more useful as releasable adhesives than the adhesive compositions not containing crosslinked block copolymer because the RBT, LT, and PA of the invention adhesives are all lower than those of the non-crosslinked polymers. It is important that the short term heat resistance is about equal for both adhesive compositions.

We claim:

1. A releasable pressure sensitive adhesive composition comprising:
   (a) a block copolymer comprising at least one poly(monovinyl aromatic hydrocarbon) block and at least one poly(conjugated diene) block and having a vinyl content of at least 3% by weight,
   (b) a solid tackifying resin, and
   (c) a plasticizer,
wherein the block copolymer has been crosslinked without the use of a curing accelerator through its vinyl groups by means of a reaction, in the presence of a crosslinking catalyst, with an organohydrogenpolysiloxane crosslinking agent which contains at least two hydrogen atoms which are directly bonded to a silicon atom, and wherein the plasticizer is present in an amount of from 1 to 50 parts by weight per 100 parts by weight of the block copolymer.

2. A releasable adhesive composition according to claim 1 wherein the block copolymer is a linear block copolymer comprising two poly(monovinyl aromatic hydrocarbon) endblocks and one poly(conjugated diene) midblock.

3. A releasable adhesive composition according to claim 1 wherein the block copolymer is a radial block copolymer of the general formula $$(AB)_n(B)_mX$$

wherein A is a poly(vinyl aromatic hydrocarbon) block, B is a poly(conjugated diene) block, X is a coupling agent residue, n and m are integers of from 0 to 30, and n+m is at least 3.

4. A releasable adhesive composition according to claim 1 wherein the poly(monovinyl aromatic hydrocarbon) block is a polystyrene block and the poly(conjugated diene) block is a polybutadiene or polyisoprene block.

5. A releasable adhesive composition according to claim 2 wherein the poly(monovinyl aromatic hydrocarbon) block is a polystyrene block and the poly(conjugated diene) block is a polybutadiene or polyisoprene block.

6. A releasable adhesive composition according to claim 3 wherein the poly(monovinyl aromatic hydrocarbon) block is a polystyrene block and the poly(conjugated diene) block is a polybutadiene or polyisoprene block.

7. A releasable adhesive composition according to claim 1 wherein the polymer has a vinyl content of from 3 to 75% by weight.

8. A releasable adhesive composition according to claim 1 wherein the polymer has a vinyl content of from 3 to 60% by weight.

9. A releasable adhesive composition according to claim 1 wherein the polymer has a vinyl content of from 4 to 40% by weight.

10. A releasable adhesive composition according to claim 1 wherein the polymer has a vinyl content of from 3 to 10% by weight.

11. A releasable adhesive composition according to claim 1 wherein the organohydrogenpolysiloxane has the general formula

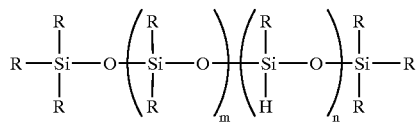

wherein R on each position independently represents a methyl or ethyl group, m is an integer of from 0 to 200, and n is an integer of from 2 to 60.

* * * * *